US008587695B2

(12) United States Patent
Cheung et al.

(10) Patent No.: US 8,587,695 B2
(45) Date of Patent: Nov. 19, 2013

(54) IMAGE CAPTURING DEVICE CAPABLE OF AUTOMATICALLY SWITCHING CLOCK OF MEMORY AND CONTROL METHOD THEREOF

(75) Inventors: Li-Fung Cheung, Huntington Beach, CA (US); Chia-Ming Hsueh, Hsinchu (TW)

(73) Assignee: Altek Corporation, Hsinchu (TW)

( * ) Notice: Subject to any disclaimer, the term of this patent is extended or adjusted under 35 U.S.C. 154(b) by 170 days.

(21) Appl. No.: 13/399,335

(22) Filed: Feb. 17, 2012

(65) Prior Publication Data
US 2013/0076957 A1    Mar. 28, 2013

(30) Foreign Application Priority Data
Sep. 28, 2011   (TW) .............................. 100135117 A

(51) Int. Cl.
*H04N 5/222*   (2006.01)
*H04N 5/76*    (2006.01)
(52) U.S. Cl.
USPC .................................. 348/231.9; 348/333.01
(58) Field of Classification Search
USPC ................ 348/231.99, 231.9, 333.01, 333.13
See application file for complete search history.

(56) References Cited

U.S. PATENT DOCUMENTS

2004/0196305 A1* 10/2004 Okuno et al. .................. 345/698
2009/0015701 A1*  1/2009 Noh .............................. 348/311

* cited by examiner

*Primary Examiner* — Tuan Ho
*Assistant Examiner* — Selam Gebriel
(74) *Attorney, Agent, or Firm* — Wang Law Firm, Inc.; Li K. Wang; Stephen Hsu

(57) ABSTRACT

An image capturing device capable of automatically switching the clock of the memory and a control method thereof. The image capturing device comprises an image capturing module, a display module, an image buffer module, an operating module and a processing module. The operating module increases the clock of the image buffer module to a first clock, and works with the image capturing module to perform an image capturing process. After the image capturing process is finished, the processing module stops a timing generating unit in the operating module from sending a synchronizing signal to the display module, and controls the operating module to decrease the clock of the image buffer module from the first clock to a second clock. Finally, the processing module controls the timing generating unit to re-send the synchronizing signal to the display module.

17 Claims, 13 Drawing Sheets

IMAGE CAPTURING DEVICE CAPABLE OF AUTOMATICALLY SWITCHING CLOCK OF MEMORY AND CONTROL METHOD THEREOF

CROSS-REFERENCE TO RELATED APPLICATION

This application claims the benefit of priority to Taiwan Patent Application No. 100135117, filed on Sep. 28, 2011, in the Taiwan Intellectual Property Office, the disclosure of which is incorporated herein in its entirety by reference.

BACKGROUND OF THE INVENTION

1. Field of the Invention

The present invention relates to an image capturing device, in particular to the image capturing device capable of automatically switching the clock of a memory and a control method thereof to save power consumption during the operation of the image capturing device.

2. Description of the Related Art

In recent years, electronic devices with an image capturing function such as mobile phones, digital still cameras and digital video cameras become increasingly more popular. In the development of these portable electronic devices, how to lower the power consumption is always an important issue. If the working clock can be adjusted dynamically without affecting the operation performance and certain functions can be executed at a slower clock, the power consumption can be reduced effectively.

For example, when the digital still camera is operated in a live view mode, the resolution of captured images is lower so that DRAM serving as an image buffer can be operated at a lower working clock for storing data. When the digital still camera is operated in photographing mode to take pictures, compared to the live view mode, the captured images have a higher resolution and thus the DRAM must be operated at a higher clock for storing data and providing a higher resolution for the captured images.

However, the image capturing device available in the market is operated at a working clock of the same frequency regardless of being executed at both the live view mode and photographing mode, and thus cause electric power wasting. Therefore, it is a main subject for the present invention to adjust the working clock without affecting the quality of capturing images and displaying the images immediately by the image capturing device.

SUMMARY OF THE INVENTION

Therefore, it is a primary objective of the present invention is to overcome the shortcomings of the prior art by providing an image capturing device capable of automatically switching the clock of a memory and a control method thereof, in order to overcome the problem of incapable of decreasing the working clock of the DRAM of image capturing device after the images are captured by the image capturing device.

To achieve the aforementioned objective, an image capturing device capable of automatically switching the clock of a memory in the present invention comprises a display module, an image buffer module, an operating module and a processing module. The display module is arranged for displaying an image. The image buffer module is arranged for providing a buffer to the image. The operating module, including a timing generating unit, is arranged for increasing a clock of the image buffer module to a first clock to execute an image capturing process. The processing module is arranged for controlling the timing generating unit to send a synchronizing signal to the display module after the image capturing process is finished, and controlling the operating module to decrease the first clock to a second clock, and finally controlling the timing generating unit to re-send the synchronizing signal to the display module.

To achieve the aforementioned objective, the present invention provides a memory clock control method applicable in an image capturing device, comprising the steps of: using an operating module to increase a clock of an image buffer module to a first clock to execute an image capturing process; using a processing module to control a timing generating unit of the operating module to stop sending a synchronizing signal to a display module after the image capturing process is finished; using the processing module to control the operating module to decrease the first clock to a second clock; and using the processing module to control the timing generating unit to re-send the synchronizing signal to the display module.

In an embodiment, the processing module may restart the timing generating unit to return the timing generating unit to a default state to stop sending the synchronizing signal.

In an embodiment, the display module may display a temporary image after stopping the synchronizing signal being sent to the display module.

In an embodiment, the processing module may control the timing generating unit to send a synchronizing signal to a display module before the temporary image disappears.

In an embodiment, a dynamic image or a static image may be captured by an image capturing module in the image capturing process, and saved in an image buffer module operated at the first clock after processing by the operating module, and then executed the image processing.

In an embodiment, the display module may be a LCD.

To achieve the aforementioned objective, an image capturing device capable of automatically switching the clock of a memory in the present invention further comprises a clock adjusting means, an image processing means and a timing control means. The clock adjusting means is arranged for controlling a clock of an image buffer of the image capturing device. The image processing means is arranged for increasing the clock of the image buffer to a first clock during the clock adjusting means, and then executing an image processing process. The timing control means is arranged for stopping inputting a synchronizing signal to a display after the image processing process is finished, and decreasing the clock of the image buffer to a second clock, and then inputting the synchronizing signal to the display again in the clock adjusting means.

In an embodiment, timing control means may restart the display timing generator to return the display timing generator to a default state to stop sending the synchronizing signal.

In an embodiment, the display may display a temporary image after stopping the synchronizing signal being sent to the display.

In an embodiment, timing control means may control the display timing generator to send the synchronizing signal to the display before the temporary image disappears.

To achieve the aforementioned objective, an electronic device in the present invention comprises a display module, an image buffer module, an operating module and a processing module. The display module is arranged for displaying an image. The image buffer module is arranged for providing a buffer to the image. The operating module, including a timing generating unit, is arranged for increasing a clock of the image buffer module to a first clock to execute a function process. The processing module is arranged for controlling the timing generating unit to send a synchronizing signal to the display module after the function process is finished, and controlling the operating module to decrease the first clock to a second clock, and finally controlling the timing generating unit to re-send the synchronizing signal to the display module.

In an embodiment, the function process may be an image capturing process.

The image capturing device capable of automatically switching the clock of a memory and the control method in accordance with the present invention have one or more of the following advantages:

(1) The image capturing device capable of automatically switching the clock of a memory and the control method thereof can decrease the working clock of the image buffer of the image capturing device without stopping the image output from the LCD, so as to save electric power of the electronic device and extend the using time of the battery of the electronic device.

(2) The image capturing device capable of automatically switching the clock of a memory and the control method thereof can achieve the power saving effect without the need of revising the circuit of the electronic device, so that the invention can extend the standby time of the electronic device without incurring a higher manufacturing cost of the electronic device.

DETAILED DESCRIPTION OF THE PREFERRED EMBODIMENTS

The technical characteristics of the image capturing device, electronic device and memory clock control method of the present invention may become apparent with the detailed description of preferred embodiments and the illustration of related drawings as follows. It is noteworthy to point out that same numerals are used in the following preferred embodiments to represent respective elements.

The image capturing device of the present invention can be a digital still camera (DSC), a camera phone, a digital video camera, or any electronic device with an image capturing function. To illustrate the technical characteristics of the present invention, the digital still camera is used as an example for the illustration, but the invention is not limited to such arrangement only.

Figure 1:
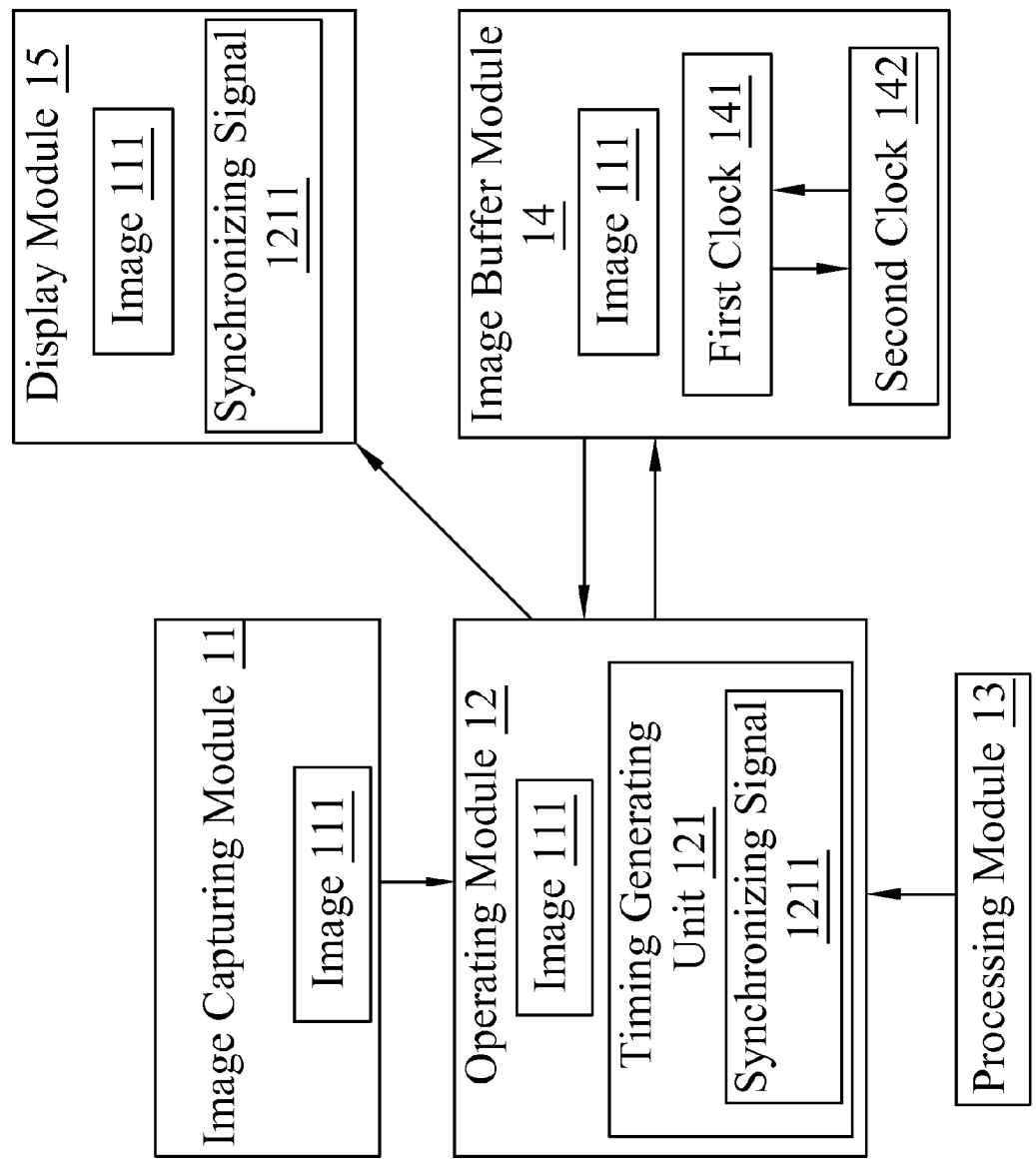
FIG. 1 is a block diagram of an image capturing device capable of automatically switching the clock of a memory in accordance with a first preferred embodiment of the present invention.

With reference to FIG. 1 for a block diagram of an image capturing device capable of automatically switching the clock of a memory in accordance with a first preferred embodiment of the present invention, the image capturing device capable of automatically switching the clock of a memory 1 comprises an image capturing module 11, an operating module 12, a processing module 13, an image buffer module 14 and a display module 15. The image capturing module 11 can be a camera lens or a light sensing element for capturing an image 111, wherein the light sensing element can be a complementary metal oxide semiconductor (CMOS) or a charge coupled device (CCD).

When the image capturing device 1 enters into a live view mode, the captured image 111 is processed by the operating module 12, and then saved into the image buffer module 14, and finally inputted into the display module 15 through the timing generating unit 121. This image 111 does not require a too-high resolution, so that the image buffer module 14 can use a lower second clock 142 for the operation. However, when the image capturing device 1 executes the image capturing process, the image buffer module 14 requires a higher clock for the operation, so as to provide a higher resolution of the captured image and executes the image processing. The image buffer module 14 can be a dynamic random access memory (DRAM).

Now, the operating module 12 increases the working clock of the image buffer module 14 to a higher first clock 141, and the image capturing module 11 is further provided for performing the image capturing process, such that the captured image can have a higher resolution. The operating module 12 can be an application specific integrated circuit (ASIC) of a digital still camera or a camera phone. The image capturing process can be a process executed after a static picture is taken or a dynamic movie is recorded, and the captured image is processed.

The processing module 13 can be a central processing unit (CPU), and the processing module 13 can control the timing generating unit 121 of the operating module 12 to stop sending a synchronizing signal 1211 to the display module 15 after the operating module 12 has captured an image and processed the image. Now, the display module 15 does not need to extract the image from the image buffer module 14. Therefore, the processing module 13 can control the operating module 12 to decrease the working clock of the image buffer module 14 to a lower second clock 142, such that when the image capturing device 1 enters into a live view mode and any other operating mode, the operation can be achieved at a lower clock to save power consumption.

It is noteworthy to point out that when the timing generating unit 121 stops sending the synchronizing signal 1211 to the display module 15, the display module 15 cannot receive any image signal. Now, the display module 15 just displays the remaining image. This phenomenon is caused by a hysteresis phenomenon of the display module 15. In the condition without any input of an image signal, the remaining image can stay for a certain period of time. Now, the processing module 13 can control the operating module 12 to decrease the working clock of the image buffer module 14 to a lower second clock 142. Before the remaining image disappears, the timing generating unit 121 in the operating module 12 is controlled to send the synchronizing signal 1211 to the display module 15 again. Although the signal of the display module 15 has been interrupted for a short time, yet the user still can see the remaining image on the display module 15 without noticing that the signal of the display module 15 has been stopped. Therefore, the present invention can be applied to any display having the lag phenomenon such as a liquid crystal display (LCD).

Figure 2:
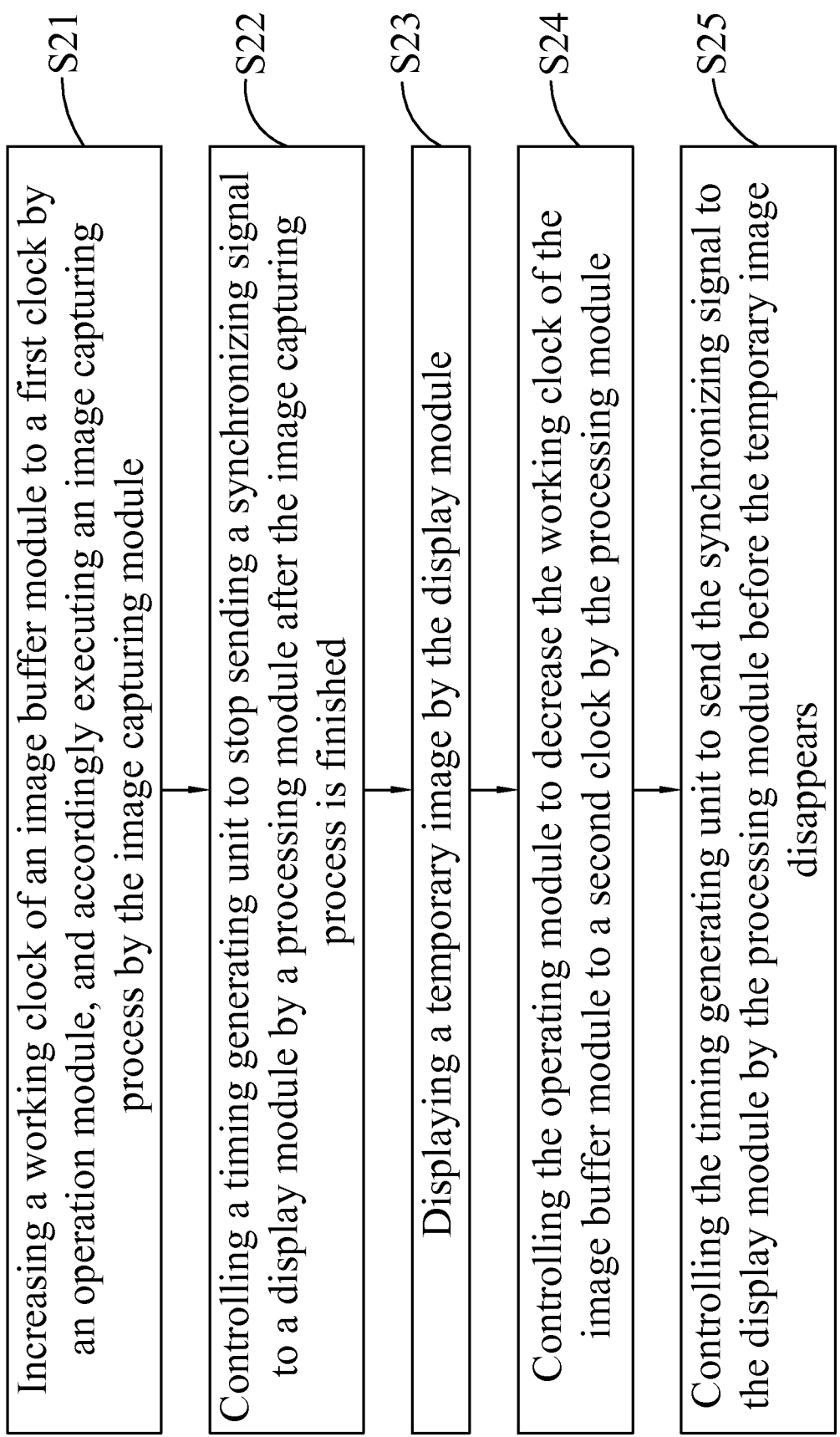
FIG. 2 is a flow chart of an image capturing device capable of automatically switching the clock of a memory in accordance with the first preferred embodiment of the present invention.

With reference to FIG. 2 for a flow chart of an image capturing device capable of automatically switching the clock of a memory in accordance with the first preferred embodiment of the present invention, the operation of the image capturing device comprises the following steps.

Step S21: Increasing a working clock of an image buffer module to a first clock by an operation module, and accordingly executing an image capturing process by the image capturing module.

Step S22: Controlling a timing generating unit to stop sending a synchronizing signal to a display module by a processing module after the image capturing process is finished.

Step S23: Displaying a temporary image by the display module.

Step S24: Controlling the operating module to decrease the working clock of the image buffer module to a second clock by the processing module.

Step S25: Controlling the timing generating unit to send the synchronizing signal to the display module by the processing module before the temporary image disappears.

Figure 3:
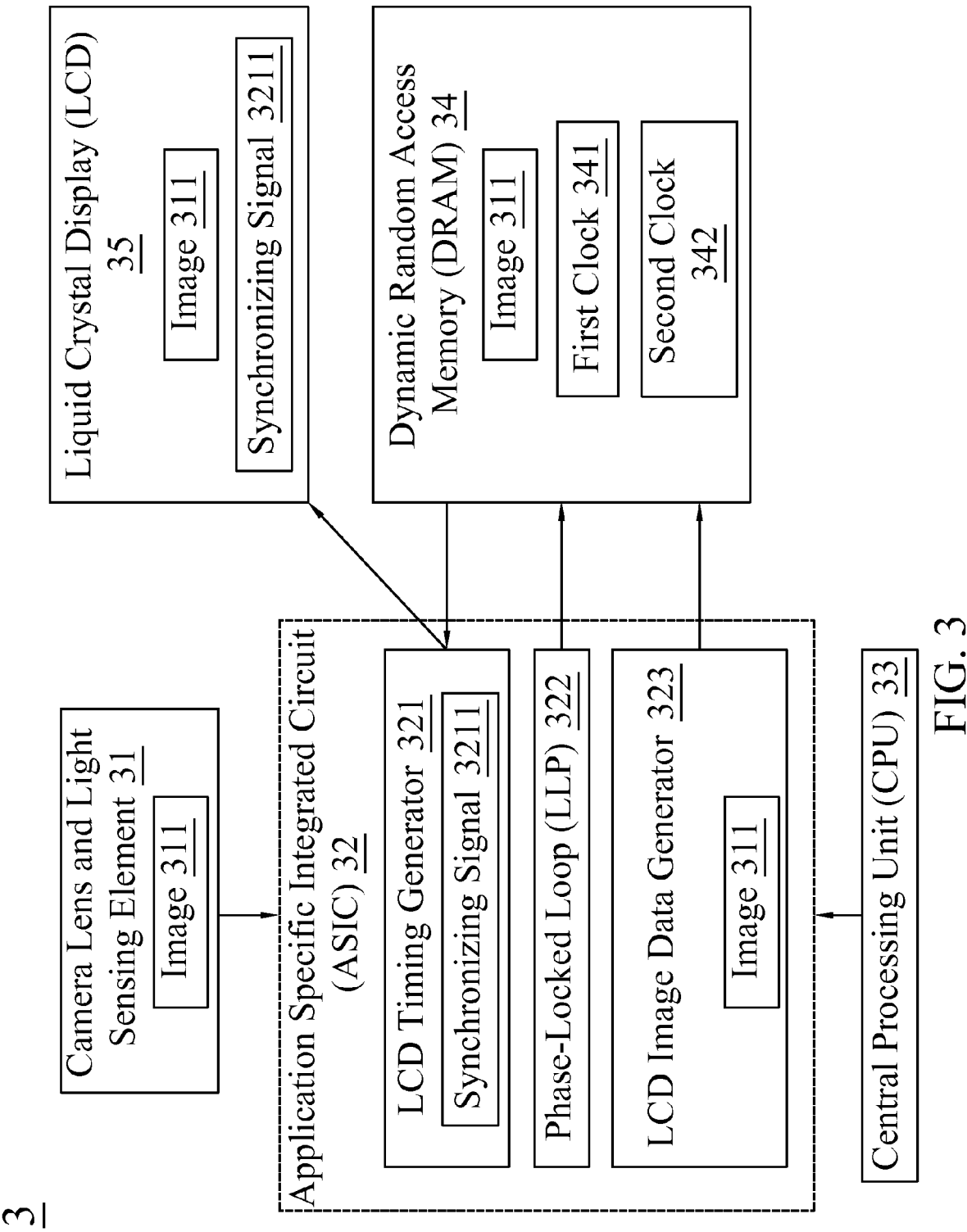
FIG. 3 is a block diagram of an image capturing device capable of automatically switching the clock of a memory in accordance with a second preferred embodiment of the present invention.

With reference to FIG. 3 for a block diagram of an image capturing device capable of automatically switching the clock of a memory in accordance with the second preferred embodiment of the present invention, the image capturing device capable of automatically switching the clock of a memory 3 is a digital still camera including a camera lens and a light sensing element 31, an ASIC 32, a CPU 33, a DRAM 34 and a LCD 35. The ASIC 32 includes a LCD timing generator 321, a phase-locked loop (PLL) 322, a LCD image data generator 323 and a memory physical layer (DDR PHY) (not shown in the figure). It is noteworthy to point out that the CPU 33 can also be arranged on the ASIC 32.

When the digital still camera enters into the live view mode, the image 311 captured by a camera lens and a light sensing element 31 is processed by a LCD image data generator 323 installed in an ASIC 32, and then saved in the DRAM 34, and finally displayed on the LCD 35. Since the captured image 311 does not require a high resolution, therefore the DRAM 34 can be operated by a second clock 342 with a lower speed.

When the user presses a shutter, the image on the LCD 35 disappears, and a dark screen shows up for approximately one to two seconds. Now, the CPU 33 can use a PLL 322 in the ASIC 32 and a delay phase-locked loop (DLL) (not shown in the figure) in the DRAM 34 to increase the working clock of the DRAM 34 to the first clock 341 to facilitate processing the captured image and output a high-resolution image.

After the user has finished the image capture, the digital still camera will return to the live view mode again, and the user can continue looking for the desired object to be photographed. Now, the LCD 35 of the digital still camera will not permit any dark screen to show up. At the same time, the CPU 33 will restart the LCD timing generator 321 to return the LCD timing generator to the default state and stop sending the synchronizing signal 3211 to the LCD 35. Since LCD 35 has not extracted any image from the DRAM 34, therefore the CPU 33 can control the PLL 322 in the ASIC 32 to decrease the working clock of the DRAM 34 to a second clock 342.

Now, the LCD 35 displays a remaining temporary image. The CPU 33 needs to control the LCD timing generator 321 to send the synchronizing signal 3211 to the LCD 35 again before the temporary image disappears. Besides the digital still camera, the present invention can also be applied to any electronic device capable of taking dynamic images or static images such as a digital video camera and a camera phone.

It is noteworthy to point out that most users use the digital still camera to find the desired object to be photographed in most of the time, and the actual time taken by the user to capture an image and process the image is only a small portion of the time used by the digital still camera. However, the conventional digital still camera cannot decrease the working clock of the image buffer, so that the image buffer requires a first clock 341 with a higher speed for the operation, regardless of its setting to a photographing mode, a live view mode or any other operating mode, and thus wasting the power consumption. Therefore, the image capturing device capable of automatically switching the clock of a memory and the control method in accordance with the present invention can overcome the problem of consuming too much power by the conventional image capturing device.

On the other hand, persons ordinarily skilled in the art can combine different functional modules into an integrated device, or break down each functional module into finer components and further use different means with the same effect to achieve the same result, without departing from the scope and spirit of the present invention.

Furthermore, all electronic devices having a display with hysteresis phenomenon, such as LCD, and needing to adjust the frequency of the DRAM thereof in different scenarios to save electricity are not departing from the scope and spirit of the present invention.

Figure 4:
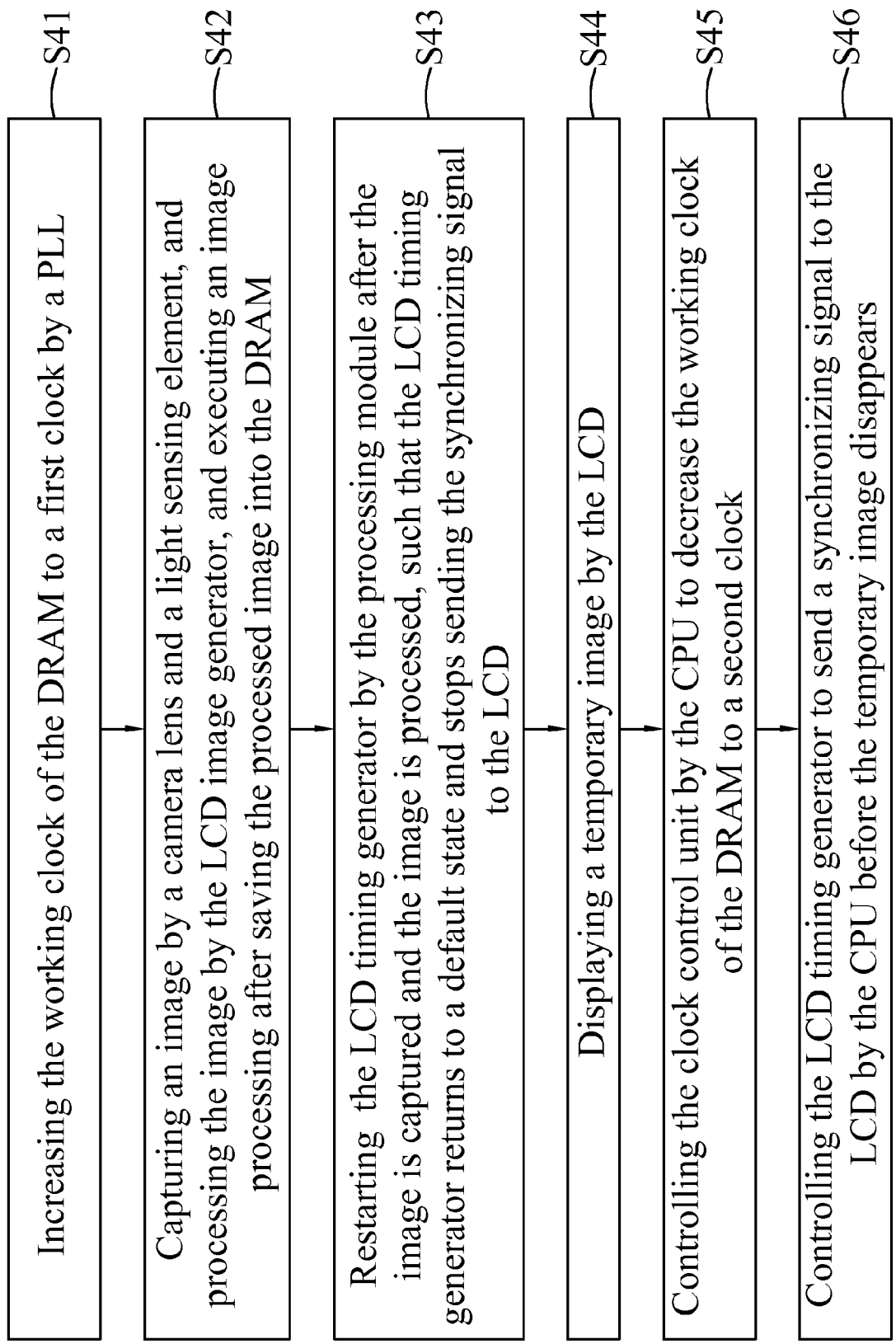
FIG. 4 is a flow chart of an image capturing device capable of automatically switching the clock of a memory in accordance with the second preferred embodiment of the present invention.

With reference to FIG. 4 for a flow chart of an image capturing device capable of automatically switching the clock of a memory in accordance with the second preferred embodiment of the present invention, the operation comprises the following steps.

Step S41: Increasing the working clock of the DRAM to a first clock by a PLL.

Step S42: Capturing an image by a camera lens and a light sensing element, and processing the image by the LCD image generator, and executing an image processing after saving the processed image into the DRAM.

Step S43: Restarting the LCD timing generator by the processing module after the image is captured and the image is processed, such that the LCD timing generator returns to a default state and stops sending the synchronizing signal to the LCD.

Step S44: Displaying a temporary image by the LCD.

Step S45: Controlling the clock control unit by the CPU to decrease the working clock of the DRAM to a second clock.

Step S46: Controlling the LCD timing generator to send a synchronizing signal to the LCD by the CPU before the temporary image disappears.

Figure 5:
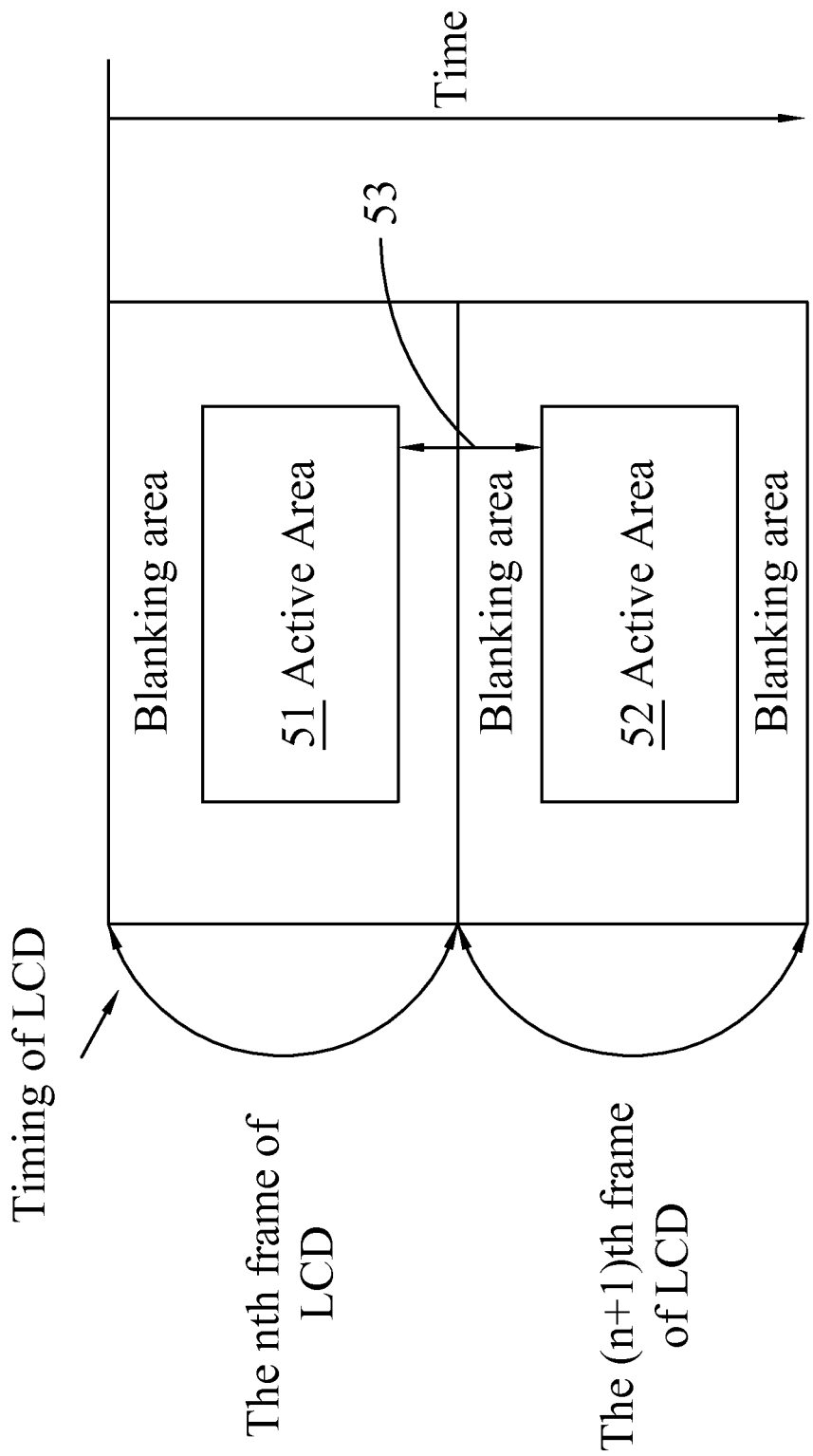
FIG. 5 is a timing chart of a LCD of a conventional digital still camera.

With reference to FIG. 5 for the timing chart of a LCD of a conventional digital still camera, active areas 51, 52 and a blanking area 53 are defined between the nth frame and the (n+1)th frame of the LCD. Since the LCD requires no image signal in the blanking area, therefore the DRAM can be turned off to adjust the working clock of the DRAM. However, the blanking area 53 is too short, and the CPU of the digital still camera cannot use this blanking area 53 to adjust the working clock of the DRAM.

Figure 6:
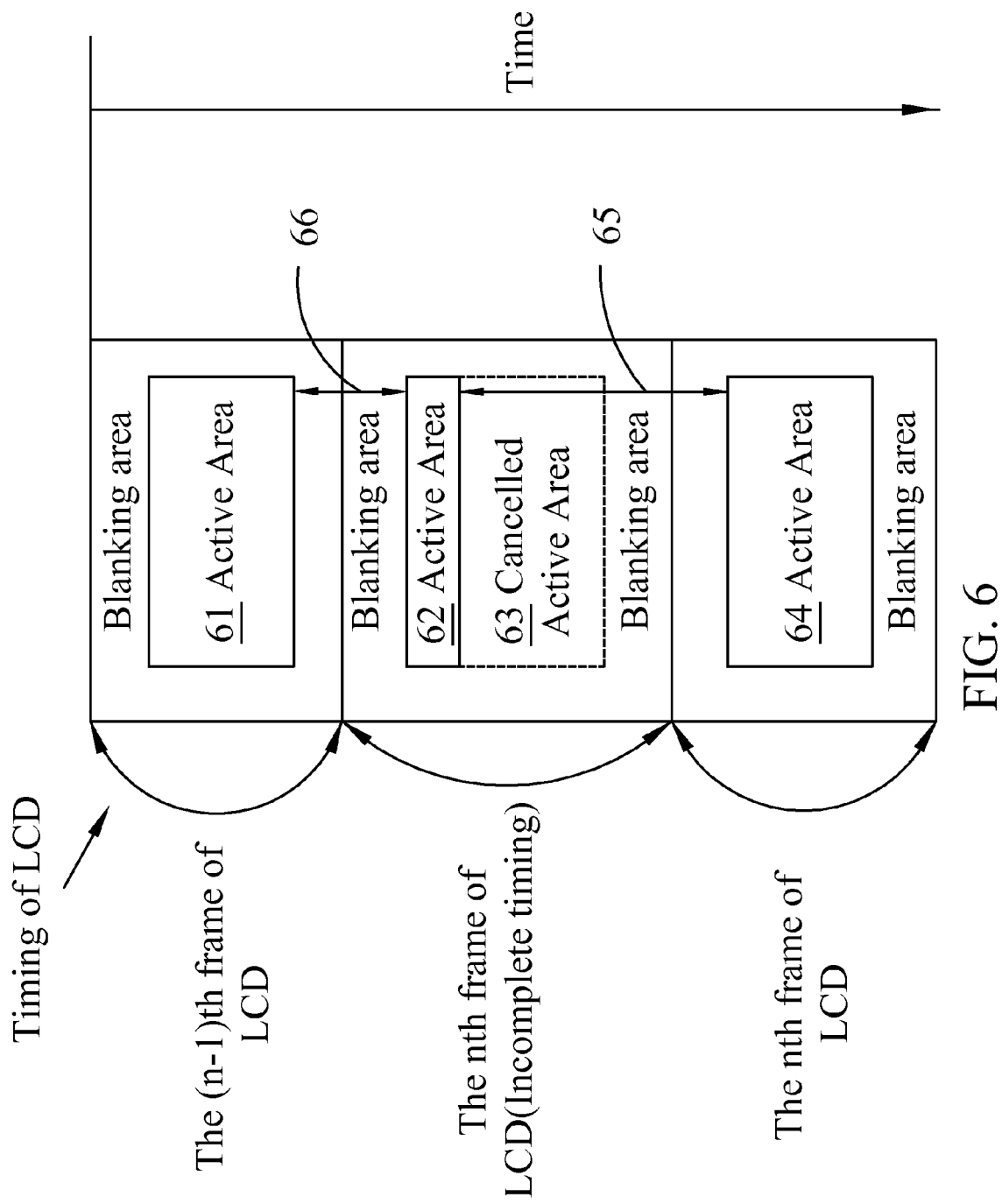
FIG. 6 is a timing chart of a LCD of a digital still camera of the present invention.

With reference to FIG. 6 for the timing chart of a LCD of a digital still camera of the present invention, active areas 61, 62 and a blanking area 66 are formed between (n−1)th frame and the nth frame of the LCD. The blanking area 66 is still very short, and the CPU of the digital still camera still cannot use this blanking area 66 to adjust the working clock of the DRAM. However, at the nth frame of the LCD, the CPU of the digital still camera restarts the LCD timing generator to stop sending a synchronizing signal to a LCD.

In FIG. 6, the nth frame of the LCD has an incomplete timing, and its active area 62 is interrupted, and the cancelled active area 63 becomes a part of the blanking area 65, such that the blanking area 65 is much larger than the blanking area 66. The CPU of the digital still camera can use the blanking area 65 to adjust the working clock of the DRAM. Now, the image displayed by the LCD is the remaining image in the active areas 61, 62. When the CPU of the digital still camera controls the LCD timing generator to re-send the synchronizing signal to the LCD, the LCD will start from the nth frame and return to a vertical synchronization (VSYNC) state and a horizontal synchronization state (HSYNC). Of course, the present invention is not limited to the aforementioned arrangements only, but the CPU can stop sending synchronizing signal to the LCD anytime to achieve the same effect.

Figure 7A:
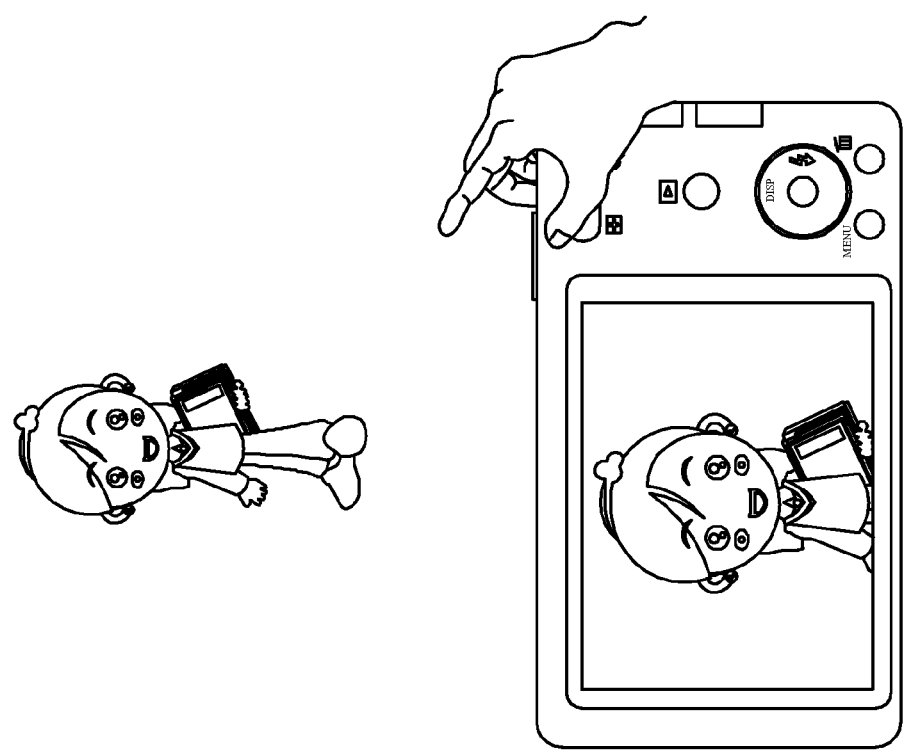
FIGS. 7A, 7B and 7C are schematic views, showing a practical application of an image capturing device capable of automatically switching the clock of a memory in accordance with the present invention.
Figure 7B:
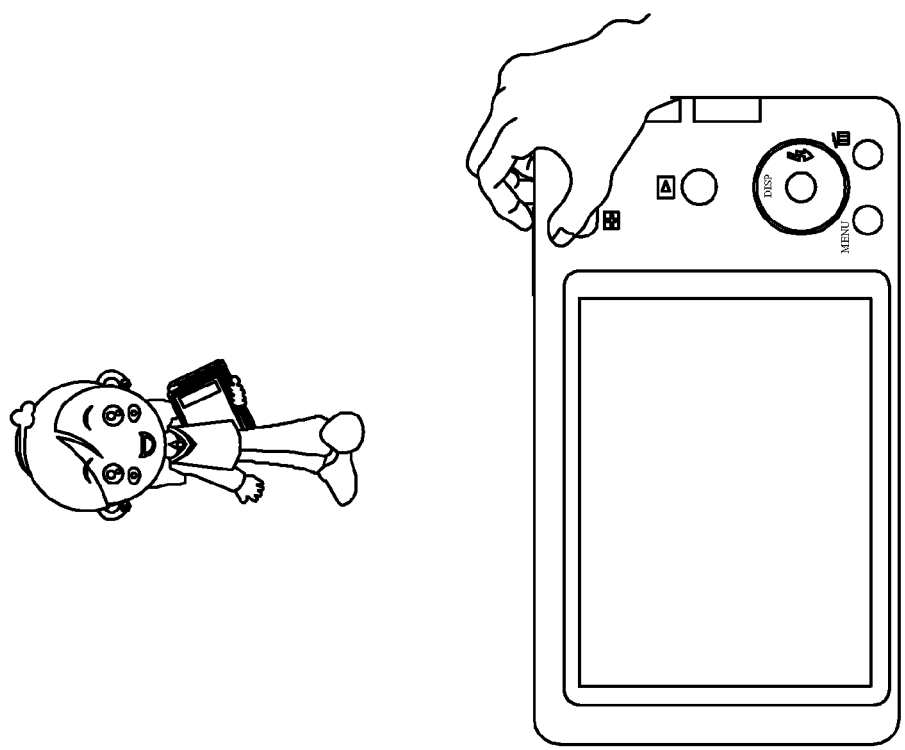
Figure 7C:
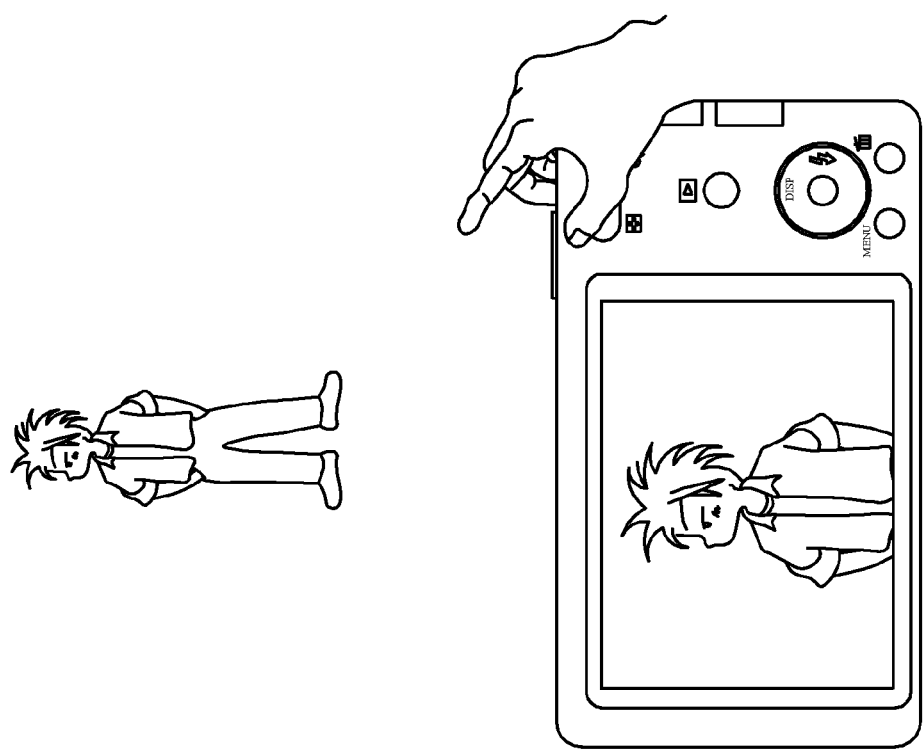

With reference to FIGS. 7A, 7B and 7C for schematic views of a practical application of an image capturing device capable of automatically switching the clock of a memory in accordance with the present invention. When a user wants to use the digital still camera with an automatic switching memory clock to take a picture of a person, FIG. 7A shows that the user is looking for a target object to be photographed, and the digital still camera is situated at a live view mode, and the DRAM is operated at a lower second clock at this moment.

In FIG. 7B, the user presses a shutter, the image on the LCD of the digital still camera disappears, and a dark screen shows up temporarily. Now, the working clock of the DRAM is increased to a first clock.

In FIG. 7C, the CPU of the digital still camera will stop the LCD timing generator to send the synchronizing signal to the LCD and decrease the working clock of the DRAM to a second clock after the photographing and image processing processes are finished, and the synchronizing signal is sent to the LCD again before the temporary image on the LCD disappears. The digital still camera returns to the live view mode again, and the user looks for a desired object to be photographed again. Due to the lag phenomenon of the LCD, the user does not notice that there is any temporary interrupt of the image signal of the LCD.

Figure 8A:
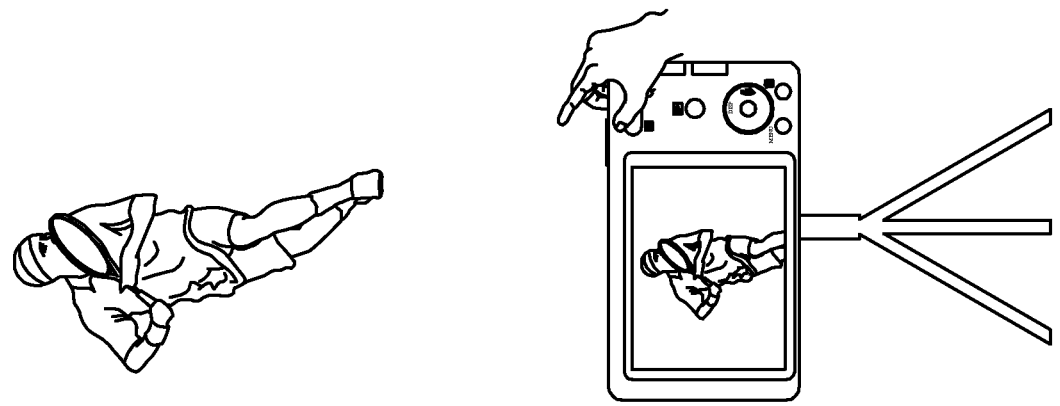
FIGS. 8A, 8B and 8C are schematic views, showing another practical application of an image capturing device capable of automatically switching the clock of a memory in accordance with the present invention.
Figure 8B:
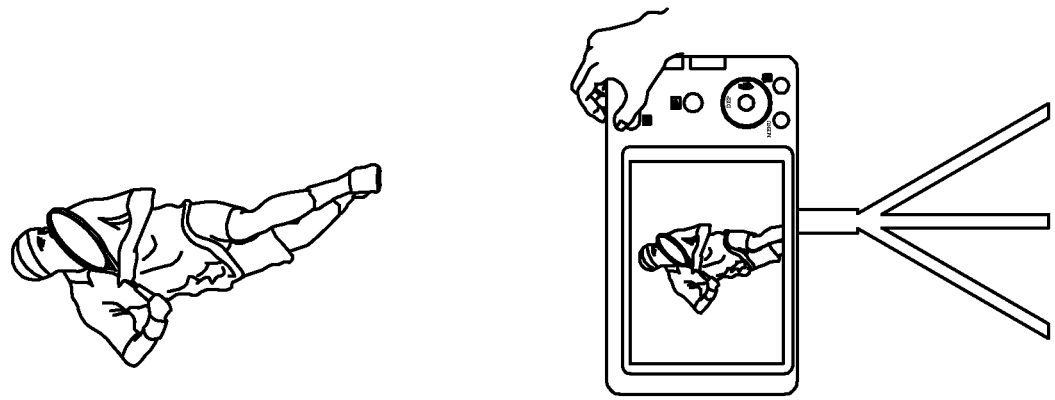
Figure 8C:
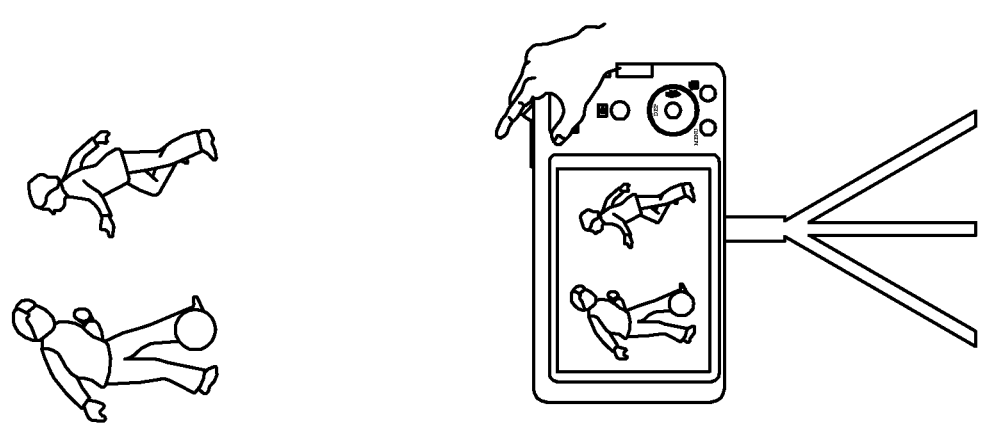

With reference to FIGS. 8A, 8B and 8C for schematic views, showing another practical application of an image capturing device capable of automatically switching the clock of a memory in accordance with the present invention. According to these figures, a user wants to use a digital video camera capable of automatically switching the clock of a memory to take a picture of a character. FIG. 8A shows that the user is looking for an object to be photograph, and the digital video camera is situated at a live view mode at this moment.

In FIG. 8B, the user presses a button of the digital video camera to start recording a video. Now, the digital video camera needs to record a high-resolution image and process the image, so that a dynamic random access memory (DRAM) installed in the digital video camera requires a clock with a higher speed for the operation.

In FIG. 8C, an image signal of a LCD of the digital video camera will be interrupted for a short time to decrease the working clock of the DRAM after completing the image capturing and processing. The digital video camera returns to the live view mode, and user starts looking for an object to be photographed again.

Even though the concept of the memory clock control method of the present invention has been described in the aforementioned process of the image capturing device capable of automatically switching the clock of a memory in accordance with the present invention, yet a flow chart is provided for further illustrating the present invention as follows.

Figure 9:
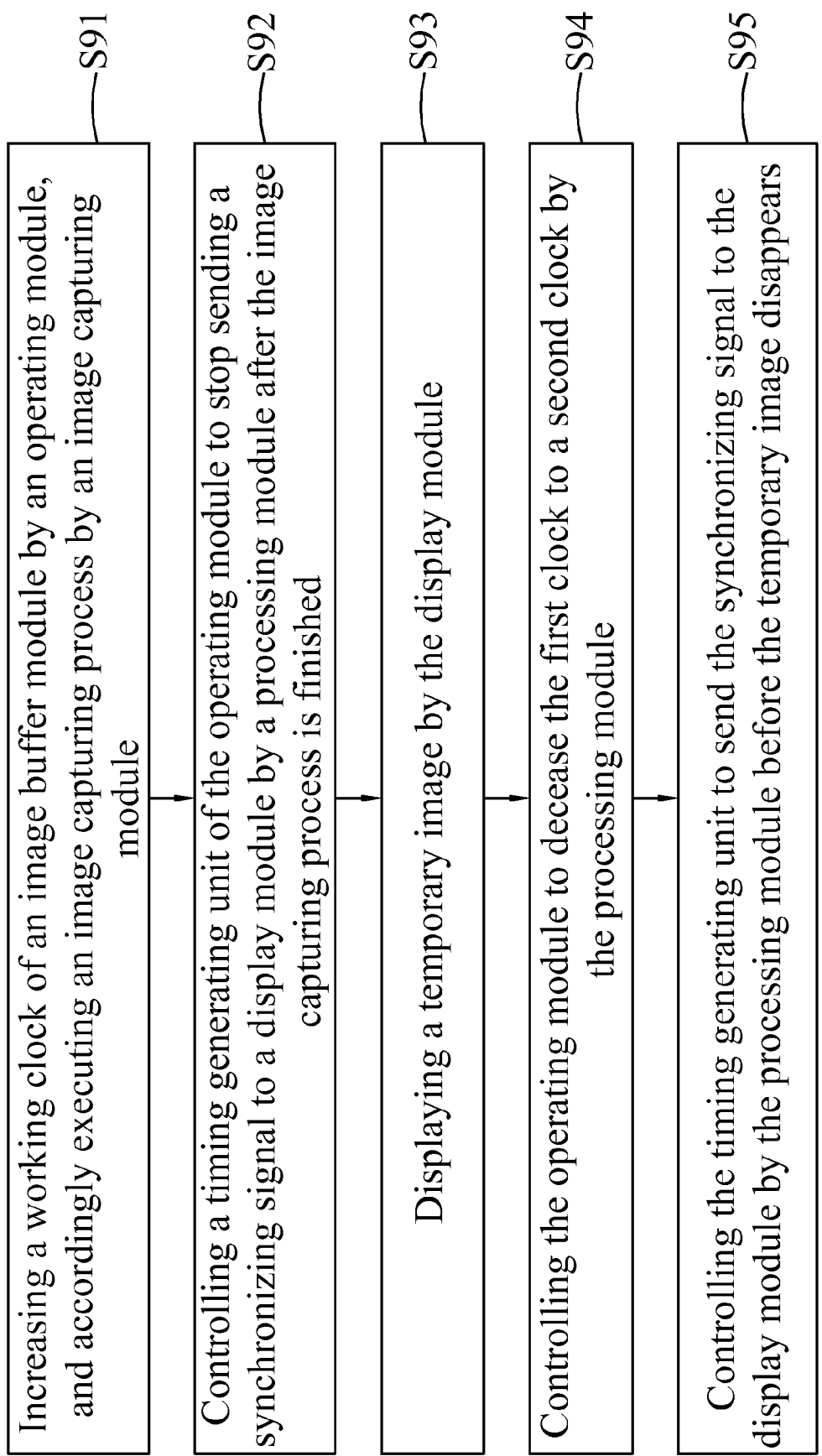
FIG. 9 is a flow chart of a memory clock control method in accordance with the present invention.

With reference to FIG. 9 for a flow chart of a memory clock control method in accordance with the present invention, the memory clock control method is applicable in an image capturing device, and the image capturing device includes an image capturing module, an operating module, a processing module, a display module and an image buffer module. The memory clock control method comprises the following steps:

Step S91: Increasing a working clock of an image buffer module by an operating module, and accordingly executing an image capturing process by an image capturing module.

Step S92: Controlling a timing generating unit of the operating module to stop sending a synchronizing signal to a display module by a processing module after the image capturing process is finished.

Step S93: Displaying a temporary image by the display module.

Step S94: Controlling the operating module to decease the first clock to a second clock by the processing module.

Step S95: Controlling the timing generating unit to send the synchronizing signal to the display module by the processing module before the temporary image disappears.

The detailed description and implementation method of the control method of the image capturing device capable of automatically switching the clock of a memory in accordance with the present invention have been described in the section of the image capturing device capable of automatically switching the clock of a memory already, and thus will not be repeated.

In summation of the description above, the image capturing device capable of automatically switching the clock of a memory and the control method in accordance with the present invention can decrease the working clock of the image buffer of the image capturing device without stopping the output of images from the LCD of the image capturing device, so as to save electric power and extend the standby time. In addition, the present invention does not require revising the circuit of the image capturing device to achieve the power saving effect, so that the manufacturing cost will not be increased. Obviously, the present invention can overcome the shortcomings of the prior art that consumes too much power image, without incurring a higher manufacturing cost of the capturing device.

What is claimed is:

1. An image capturing device capable of automatically switching the clock of a memory, comprising:
    a display module, arranged for displaying an image;
    an image buffer module, providing a buffer to the image;
    an operating module, including a timing generating unit, arranged for increasing a clock of the image buffer module to a first clock to execute an image capturing process; and
    a processing module, arranged for controlling the timing generating unit to send a synchronizing signal to the display module after the image capturing process is finished, and controlling the operating module to decrease the first clock to a second clock, and finally controlling the timing generating unit to re-send the synchronizing signal to the display module.

2. The image capturing device capable of automatically switching a clock of a memory as recited in claim 1, wherein the processing module restarts the timing generating unit to return the timing generating unit to a default state to stop sending the synchronizing signal.

3. The image capturing device capable of automatically switching a clock of a memory as recited in claim 1, wherein the display module displays a temporary image after stopping the synchronizing signal being sent to the display module.

4. The image capturing device capable of automatically switching a clock of a memory as recited in claim 3, wherein the processing module controls the timing generating unit to send the synchronizing signal to the display module before the temporary image disappears.

5. The image capturing device capable of automatically switching a clock of a memory as recited in claim 1, further comprising an image capturing module for capturing a dynamic image or a static image in the image capturing process, and the dynamic image or static image being processed by the operating module and then saved into the image buffer module operated at the first clock, and then executed the image processing.

6. The image capturing device capable of automatically switching a clock of a memory as recited in claim 1, wherein the display module is a liquid crystal display (LCD).

7. An image capturing device capable of automatically switching the clock of a memory, comprising:
   a clock adjusting means, for controlling a clock of an image buffer of the image capturing device;
   an image processing means, for increasing the clock of the image buffer to a first clock in the clock adjusting means, and then executing an image processing process; and
   a timing control means, for stopping inputting a synchronizing signal to a display after the image processing process is finished, and decreasing the clock of the image buffer to a second clock, and then inputting the synchronizing signal to the display again in the clock adjusting means.

8. The image capturing device capable of automatically switching the clock of a memory as recited in claim 7, wherein the timing control means restarts a display timing generator to return the display timing generator to a default state to stop sending the synchronizing signal.

9. The image capturing device capable of automatically switching a clock of a memory as recited in claim 7, wherein the display displays a temporary image after stopping the synchronizing signal being sent to the display.

10. The image capturing device capable of automatically switching a clock of a memory as recited in claim 9, wherein the timing control means controls the display timing generator to send the synchronizing signal to the display before the temporary image disappears.

11. A memory clock control method, applicable in an image capturing device, comprising the steps of:
   increasing a clock of an image buffer module to a first clock to execute an image capturing process by an operating module;
   controlling a timing generating unit of the operating module to stop sending a synchronizing signal to a display module by a processing module after the image capturing process is finished;
   controlling the operating module to decrease the first clock to a second clock by the processing module; and
   controlling the timing generating unit to re-send the synchronizing signal to the display module by the processing module.

12. The memory clock control method of claim 11, further comprising the step of using the processing module to restart the timing generating unit to return the timing generating unit to a default state to stop sending the synchronizing signal.

13. The memory clock control method of claim 11, wherein the display module displays a temporary image after stopping the synchronizing signal being sent to the display module.

14. The memory clock control method of claim 13, further comprising the step of using the processing module to control the timing generating unit to send the synchronizing signal to the display module before the temporary image disappears.

15. The memory clock control method of claim 11, wherein a dynamic image or a static image is captured by an image capturing module in the image capturing process, and saved into the image buffer module operated at the first clock after processing by the operating module, and then executed the image processing.

16. An electronic device, comprising:
   a display module, arranged for displaying an image;
   an image buffer module, providing a buffer to the image;
   an operating module, including a timing generating unit, arranged for increasing a clock of the image buffer module to a first clock to execute a function process; and
   a processing module, arranged for controlling the timing generating unit to send a synchronizing signal to the display module after the function process is finished, and controlling the operating module to decrease the first clock to a second clock, and finally controlling the timing generating unit to re-send the synchronizing signal to the display module.

17. The electronic device of claim 16, the function process is an image capturing process.

* * * * *